United States Patent [19]

Hoyt

[11] 4,333,169

[45] Jun. 1, 1982

[54] FLOW NOISE SUPPRESSION SYSTEM FOR A SONAR DOME

[75] Inventor: Jack W. Hoyt, Pasadena, Calif.

[73] Assignee: The United States of America as represented by the Secretary of the Navy, Washington, D.C.

[21] Appl. No.: 585,218

[22] Filed: Oct. 4, 1966

[51] Int. Cl.³ .......................... H04K 3/00; H04R 1/44
[52] U.S. Cl. ....................................... 367/1; 181/198; 367/171; 367/173; 367/901
[58] Field of Search ............... 114/0.5, 16, 67, 67.1, 114/232, 233, 20; 340/3, 4, 5, 7, 8, 8 D, 3 T, 5 D; 181/0.5, 198; 367/1, 166, 171, 173, 901

[56] References Cited

U.S. PATENT DOCUMENTS

| | | | |
|---|---|---|---|
| 3,016,865 | 1/1962 | Eichenberger | 114/67 |
| 3,084,651 | 4/1963 | Parmenter | 114/0.5 |
| 3,286,674 | 11/1966 | Thompson et al. | 367/1 X |

Primary Examiner—Richard A. Farley
Attorney, Agent, or Firm—Robert F. Beers; Ervin F. Johnston; M. F. Ogle

[57] ABSTRACT

Apparatus for suppression of water flow noises in connection with a keel mounted sonar dome. A solution of water soluble polymer is ejected through a series of holes along the leading edge of the sonar dome under forward movement of the ship. The concentration and flow rate is chosen to "bathe" the dome in a very dilute dispersion (of the order of 10 parts per million by weight) of the polymer.

5 Claims, 4 Drawing Figures

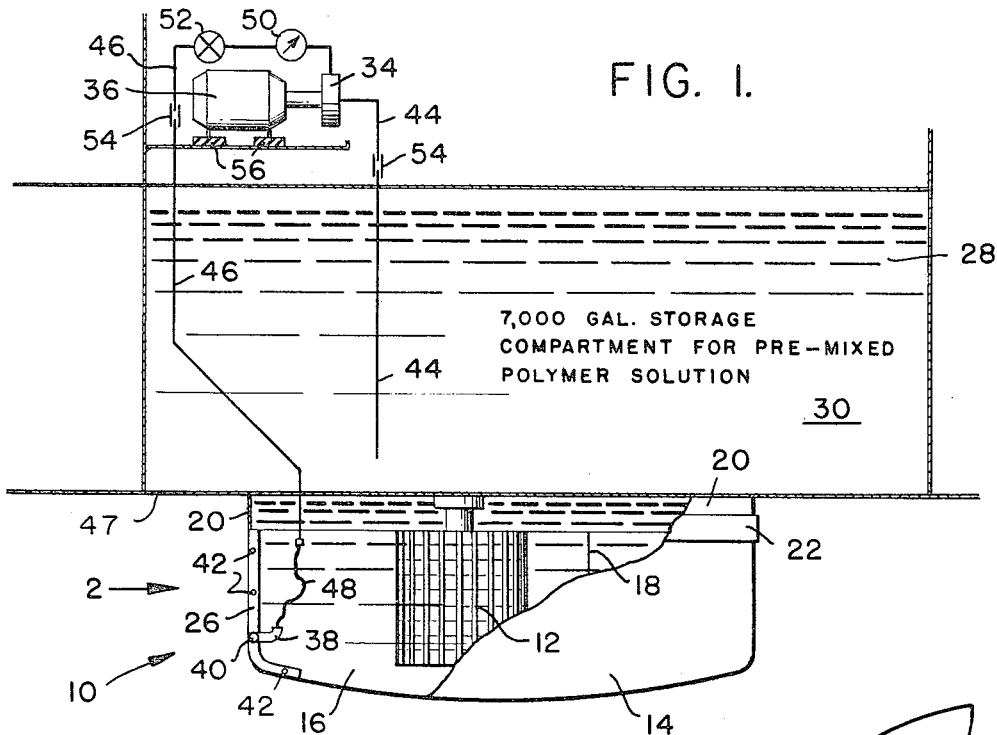
FIG. 1.
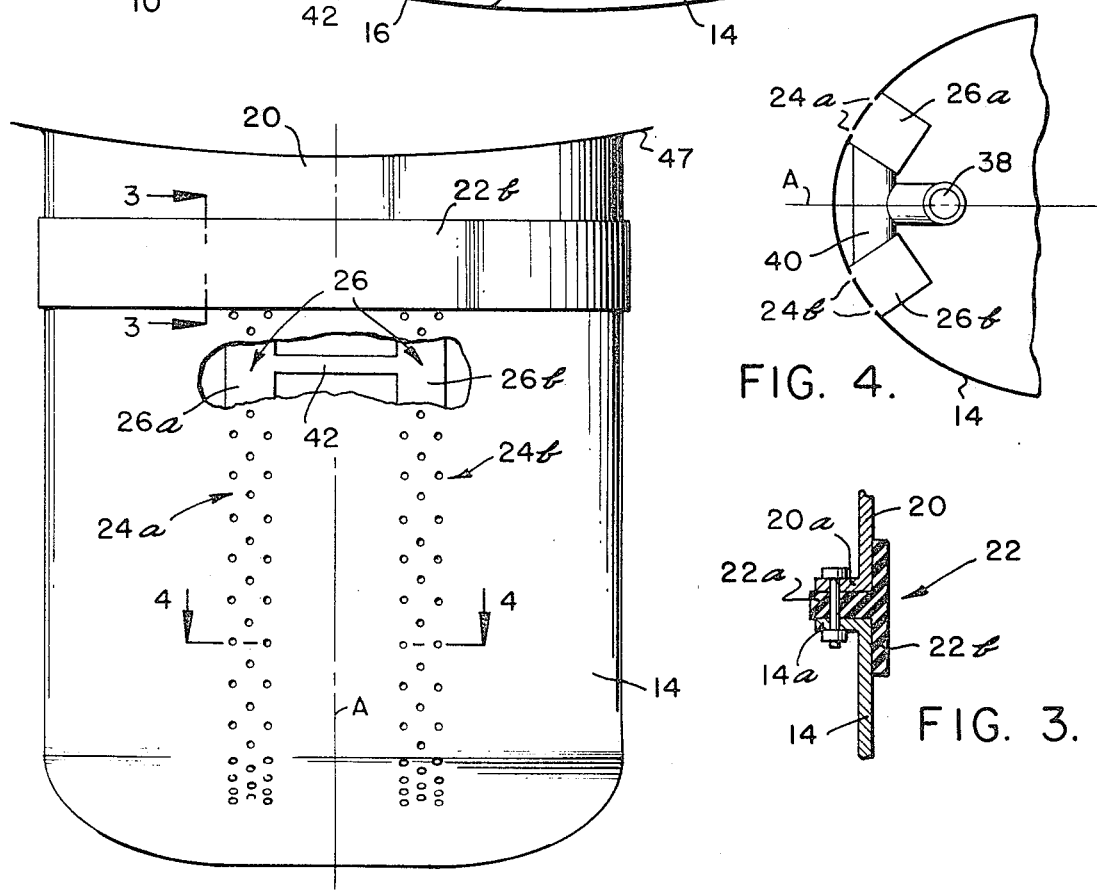
FIG. 2.
FIG. 3.
FIG. 4.

FLOW NOISE SUPPRESSION SYSTEM FOR A SONAR DOME

The invention described herein may be manufactured and used by or for the Government of the United States of America for governmental purposes without the payment of any royalties thereon or therefor.

This invention relates to the suppression of water flow noises at the input of sonar systems carried by a moving water craft. More particularly it is of special utility in connection with keel mounted sonars of the type enclosed by a dome adapted to allow transmission of sound signals therethrough.

For purposes of this specification, "hydrodynamic boundary layer" is defined as the layer of flow of ambient water adjoining the exterior surface of a body which is characterized by a gradient of stream velocities in the direction normal to the exterior surface of the body. Its nominal outer limit is conventionally defined as the distance from the body to the point where this velocity gradient has essentially reached free stream velocity. For further details, including a diagrammatic illustration, reference is made to the copending application of A. G. Fabula et al, entitled "Torpedo Drag Reduction Employing Polymer Ejection," Ser. No. 441,002 and now U.S. Pat. No. 4,186,679. More particularly reference is made to FIG. 5 thereof, and to Column 8, line 4 through line 19.

With the advent of more efficient sonar equipment, the flow noise caused by the flow of ambient water about the exterior surface of a sonar dome during operation of the ship at speeds over 18 knots, has seriously hampered sonar usefulness. In high sea state at such speeds, sonar is virtually inoperative.

An object of the present invention is to provide an effective means for reducing flow noises in keel mounted sonars during operations with ship speeds in excess of 18 knots and in high sea states.

Other objects and many of the attendant advantages of this invention will be readily appreciated as the same becomes better understood by reference to the following detailed description when considered in connection with the accompanying drawings wherein:

FIG. 1 is a longitudinal section through a keel mounted sonar installation which includes a flow noise suppression system in accordance with the present invention;

FIG. 2 is an enlarged front view of a portion of the sonar installation taken along arrow 2, FIG. 1;

FIG. 3 is an enlarged section taken along line 3—3, FIG. 2; and

FIG. 4 is a section taken along line 4—4, FIG. 3.

Referring now to FIGS. 1 and 2 of the drawing, the subject of the invention is a flow noise suppression system for use with a keel mounted sonar dome unit 10. The conventional structure of sonar dome unit comprises an omni-directional sonar transducer array 12 of the so-called "barrel stave" type, and a shell 14 forming a closed tear-shaped dome or container about transducer array 12. The dome is symmetric about a vertical plane of symmetry A aligned with the keel line of the ship, and is made of a material chosen for its combination of sound transmission and structural properties, such as a thin stainless steel skin material conventionally reinforced by a punched out structural steel sheeting and a framework of welded tubular steel. The space between the inner surface of the shell and the transducer array 12 is filled with a liquid medium 16, such as seawater, chosen for good sound transmission properties. A transverse partition wall 18 is located behind array 12 to mask same from the ship propulsion screw noises. The transducer array 12 is directly suspended from the structure of the ship. Shell 14 is bolted to a tear drop shaped steel skirt 20 which is welded to the bottom of the ship. The bolted joint between the shell and shirt is formed between confronting flange portions 14a and 20a, FIG. 3, with a rubber vibration isolation ring 22 therebetween. Rubber ring 22 has a "T shaped" cross section consisting of a gasket portion 22a disposed between the confronting flange surfaces and a fairing portion 22b which overlays the joint.

The flow noise suppression system forming the subject of the invention generally comprises a pair of rows 24a, 24b of polymer ejection orifices formed adjacent to leading edge of the shell 14, a system of manifold channels 26 affixed to the inner surface of the shell behind the rows of orifices, a storage compartment 28 of the ship for containing a premixed solution 30 of seawater and water soluble polymer material, and an adjustable flow pumping system for delivering the premixed solution from compartment 28 to manifold channels 26, including a centrifugal pump 34, driven by a variable speed motor 36. The polymer ejection orifices are simple drilled holes extending through shell 14 and arranged in the two co-extensive vertical rows 24a and 24b disposed to one and the other side of the plane of symmetry A. Both rows extend from the top of shell 14 down and around the "chin" of the dome and thence rearwardly along the shell bottom for a short distance. The manifold channels 26 are formed as two box channels 26a and 26b, FIGS. 2 and 4, co-extensive with the rows of orifices 24a and 24b. The inlet to the channels is formed by an elbow pipe 38 which leads into a horizontal inlet feed pipe 40 interconnecting the box channels. Smaller cross connecting pipes 42 provide additional communication between channels 26 at spaced intervals therealong, in order to ensure equal flow in the two branches of the manifold. A suction pipe 44 is connected to the intake of pump 34 and extends down into compartment 28. A delivery pipe 46 is connected to the discharge outlet of pump 36 and extends through compartment 28 and through the hull plates 47 along the keel of the ship into the interior of shell 14. A link 48 of flexible hosing connects the lower end of pipe 46 to the elbow pipe 38 inlet of the manifold channels. Delivery pipe 46 includes a flow meter 50, and a shutoff valve 52, which is turned to its closed condition whenever the pump is not working in order to prevent reverse flow of ambient seawater into the system. Both the suction pipe 44 and the delivery pipe 46 include rubber collar links 54 to isolate pump vibrations, and motor 36 uses vibration isolation mountings 56.

It has been found that the preferred type of water soluble polymer additive for the preparation of premixed solution 30 is one characterized by high molecular weight, long chain, linear molecular structures. One illustrative additive material found to provide highly successful results is a synthetic poly(ethylene) oxide having a molecular weight of 4 million. A suitable commercial grade of this material, known by the trade name "Polyox," is available from Union Carbide Corporation by the catalogue designation Water Soluble Resin (WSR) 301.

In the operation of the flow noise suppression system, the premixed polymer solution is pumped from compartment 28 out through the rows of orifices 24a and 24b during operation of the sonar array 12, as the ship moves through the water. Ejection of the solution through the orifices, under the forward motion of the ship, results in the mixing and dispersion of the polymer in the "hydrodynamic boundary layer" (as defined in the preamble to this specification) of water flow about the shell, which is effect bathes the exterior surface of the shell in a sheath of the dispersed solution.

The operating parameters of the flow noise suppression system, including the value of concentration of the soluble polymer additive in solution 30 and the range of ejection flow rates produced by the variable motor driven pump 36, are selected to provide a minimum concentration of at least 10 parts by weight of polymer per million parts of water (wppm) at the trailing edge of shell 14. A value of concentration of additive of 0.2%, by weight, has been found convenient for use in a system of the type illustrated in the drawing. The solution ejection rate is adjusted whenever the speed of the ship changes, in order to maintain the concentration of polymer dispersed in the boundary layer constant. The flow rate needed to produce a given concentration for different ships speeds can be calculated from conventional height and boundary layer equations over a plate, as follows:

The equation for turbulent-boundary-layer thickness is $$\delta = 0.37 \times R^{-0.2} \quad (1)$$

where R is the Reynolds number. For a flat plate, $$R = (U_x)/(\nu) \quad (2)$$

If the temperature of the water is assumed to be 60° F., the kinematic viscosity is $1.2 \times 10^{-5}$ ft²/sec. Thus $$\delta = 0.0385 \left(\frac{x^4}{U}\right)^{0.2} \quad (3)$$

The flow rate through the boundary layer can be approximated by $$Q_B = 0.7 U C \delta \quad (4)$$

where the maximum wetted perimeter, C, of the sonar dome is approximately 10.5 feet. Thus $$Q_B = 0.283 (Ux)^{0.8} \quad (5)$$

If p is the wppm dilute concentration desired in the boundary layer at a distance x, and m is the mixture percentage, then the flow quantity of polymer fluid is $$Q = \frac{Q_B p}{10^6 m} \quad (6)$$

If x is the maximum length of the dome, 11 feet, then by substitution $$Q = 0.000575 \frac{p}{m} (U)^{0.8} \quad (7)$$

where U is measured in knots and Q is the ejection rate in gallons per minute.

One series of tests was conducted in connection with an operational system essentially as illustrated in the drawing wherein shell 14 was 100 inches in length, and approximately 4 ft in height and 4 ft in width at its widest point. Orifice rows 24a and 24b contained a total of 246 individual orifices with an average hole size of ¼". A premixed 0.2% solution of the (WSR)301 poly-(ethylene) oxide was ejected at flow rates which ranged from 73 to 83 gallons per minute (gpm) for ship speeds from 18 knots to 24 knots, to maintain a constant concentration of dispersed polymer solution in the boundary layer at the trailing edge of shell 14 of 25 wppm. Comparison of test data of flow noise present at the output of array 12 for the case of use of the present flow suppression system, with similar data for a sonar dome unit without the suppression system, indicates that for ship speeds over 18 knots an increase of 3–5 knots, depending upon sea state, may be achieved with no increase in noise level by use of the flow noise suppression system of the present invention. Stated another way, in the range of ships speeds from 18–24 knots, the flow noise suppression system of the present invention has been found the equivalent of allowing the ship to operate with a 3 to 5 knot increase in speed with no increase in flow noise at the input to its sonar.

While the ejection orifices of rows 24a and 24b used in the series of tests just described had hole sizes of approximately ¼", it is to be understood that the invention may employ a larger number of smaller holes, as for example by a means of substitution of a mesh of small holes for rows 24a and 24b. In fact, there are indications that a mesh of hole sizes of the order of 0.010" may be preferred. This preference relates to the case of operation of sonar dome unit 10 without ejection of polymer solution from the orifices, such as may be desired at lower ship speeds for purposes of conservation of polymer material. Under these circumstances, it has been found that the larger holes tend to cause "singing" noises in a frequency range which interfered with operation of the sonar equipment. Use of the mesh of small holes size both reduces these noises and places the remaining noise in a range of higher frequencies which do not tend to interfere with the sonar. It should be noted that the flow rate per unit orifice area is maintained low (as was the case with the larger holes) in order to avoid ejection of the polymer solution as jets. The latter would cause noise and result in dispersion of the polymer solution beyond the hydrodynamic boundary layer.

There is no adequate theory at present as to the exact mechanism by which flow noise suppression is accomplished by the bathing of sonar shell in the polymer solution. However, there is reason to believe that long-chain polymer molecules subdue turbulent irruptions in the boundary layer and smooth the flow about the shell. In accordance with this tentative theory, the extension of rows of orifices 24a and 24b around the chin of the shell 14 is important to the satisfactory operation of the flow noise suppression system, because that portion of the shell surface is particularly prone to turbulent irruptions.

It will be readily appreciated that the arrangement and development illustrated in the drawings and described by way of example hereinabove may be varied and modified according to requirements. For example polymer solution could be sprayed over the dome surface from external nozzles or other sources away from the immediate location of the dome; it only being necessary that the material be introduced into the boundary layer about the dome surface. Also, rather than using a stored premixed solution from the tank, dry polymer mixers may be used as the solution source. The system could be applied to torpedo or sonar apparatus as well as to keel mounted surface ship sonars. It is therefore to be understood that within the scope of the appended claims the invention may be practiced other than as specifically described.

I claim:

1. In a sonar transducer unit adapted to be carried by a moving water vehicle external to the hull thereof and submerged in the ambient stream, the combination comprising;
   (a) an acoustically transparent shell forming a substantially closed container about the transducer unit, and
   (b) means for injecting a dilute aqueous solution of a water soluble polymer material of a first predetermined concentration into the layer of ambient water flow adjoining the exterior of the surface of the shell in such a manner that substantially the entire exterior surface of the shell is bathed in the sheath of dispersed solution.

2. Apparatus in accordance with claim 1, wherein;
   (c) said water soluble polymer material is further of a type having a molecular weight in excess of 1,000,000 and having a long chain, linear, molecular structure.

3. Apparatus in accordance with claim 1;
   (d) said aqueous polymer solution being injected into the layer of ambient water flow at a flow rate chosen to maintain a concentration of polymer material of at least 10 parts per million by weight in said sheath at all regions along the surface of the shell.

4. Apparatus in accordance with claim 1 of the type adapted to be keel mounted to a surface ship,
   (e) said shell having a hydrodynamically streamlined shape symmetric about a plane parallel to the keel line of the ship, and
   (f) said means for injecting comprises a row of ejection orifices along the leading edge of the container.

5. Apparatus in accordance with claim 4 wherein;
   (g) the shell forms a chin portion where its leading edge merges with the bottom surface thereof, said row of ejection orifices extending around said chin portion.

* * * * *